Sept. 10, 1968 C. I. L. CRONBURG, JR., ETAL 3,401,340

DIVERSITY RECEIVER WITH REVERTIVE ACTION TO
A PREFERRED SELECTION

Filed March 3, 1965 2 Sheets-Sheet 1

INVENTORS C. I. L. CRONBURG, JR.
H. T. KING
J. W. KNAPP
F. M. SMITH

BY [signature]
ATTORNEY

United States Patent Office 3,401,340
Patented Sept. 10, 1968

3,401,340

DIVERSITY RECEIVER WITH REVERTIVE ACTION TO A PREFERRED SELECTION

Claude I. L. Cronburg, Jr., Lynnfield, Harold T. King, Andover, Joseph W. Knapp, Georgetown, and Frederick M. Smith, Ipswich, Mass., assignors to Bell Telephone Laboratories, Incorporated, New York, N.Y., a corporation of New York Filed Mar. 3, 1965, Ser. No. 436,838
10 Claims. (Cl. 325—304)

ABSTRACT OF THE DISCLOSURE

A diversity receiver in which the selection between received signals is made on the basis of different criteria depending upon operating conditions. Whenever reception over the channel normally preferred is above a selected threshold this channel is selected without regard to the reception over the other channel. If the preferred channel falls below threshold, the switch operates in a bistable mode and selects the better signal. The switch reverts to the preferred channel when that channel returns to threshold. An override is provided which prevents selection of a channel whose pilot signal is absent.

Figures 1, 1A, 1B:
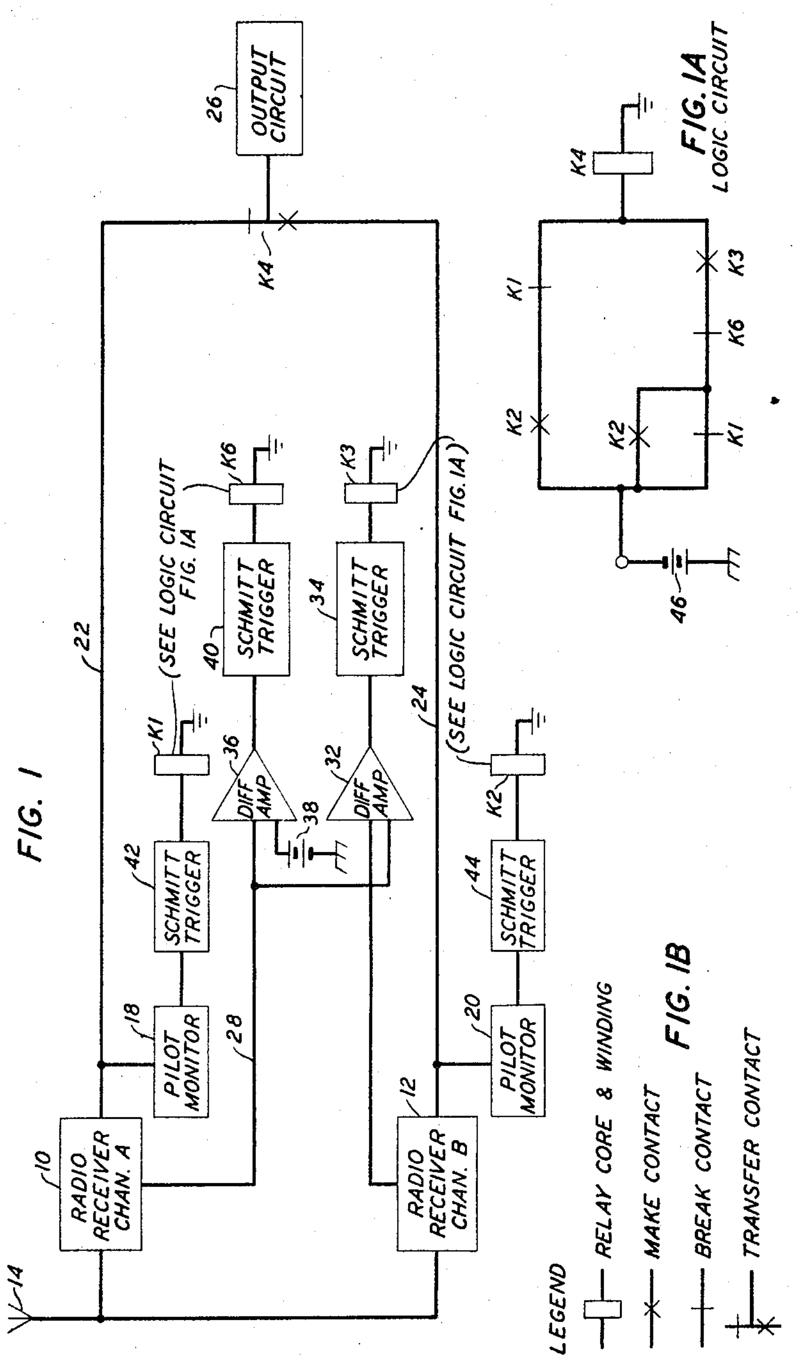

This invention relates to diversity receivers for use in radio communication systems, and more particularly, to improvements in such receivers to increase the reliability of the system.

The diversity principle has been employed in many radio communication systems to increase reliability in the face of such circumstances as fading, noise, other transmission interference, or failure of some portion of the radio communication equipment. In general, this principle envisions the use of plural transmitters and/or receivers to furnish two or more transmission facilities between terminal points, the two facilities being distinguished by separation in, or exposure to, different geographic or transmission environments. Thus, it has been known to employ widely spaced receivers operating on the same carrier frequency to obtain greater reliability of communication with a distant transmitter by virtue of the fact that transmission over the two different geographical paths may be expected to be different. Likewise, transmission over two facilities distinguished by different carrier frequencies has been used to improve communication reliability by taking advantage of the fact that fading or other atmospheric interference with transmission can be expected to differ at any particular time for different transmission frequencies.

Regardless of the strategem employed to provide diversity channels, means must be provided automatically to select that one of the transmission paths or facilities which at any time provides the best transmission performance. The most common of such means involves either combining all of the received signals and controlling the level of the combined signal in accordance with the strength of the most suitable signal or switching between received signals on a differential basis in accordance with which the signal that at any moment exceeds the other or others by a predetermined amount is selected.

The present invention is directed to the problem of improving the performance of switched diversity systems, and is particularly directed to the improvement of such performance when one of the two available transmission channels may, because of the operating frequency or because of some other circumstance, such as, smaller loss or attenuation in some portion of the transmission path used in common by the two channels may be expected on the average to provide better transmission than the other.

In accordance with the above, the diversity receiver system of the invention provides for the selective utilization of received signals from at least two transmission channels on a basis which favors a predetermined channel for connection to a utilization circuit so long as the reception over that channel exceeds a predetermined threshold level. Switching to, or substitution of, the diversity channel occurs whenever the preselected channel performance falls below a threshold level, but persists only so long as the signals from the favored channel are below that level. If, for some reason, such as fading, reception deteriorates simultaneously on both channels, provision is made to modify the switching criteria so that under such circumstances, the channel providing the better performance at that time is selected on a differential basis.

Figure 2:
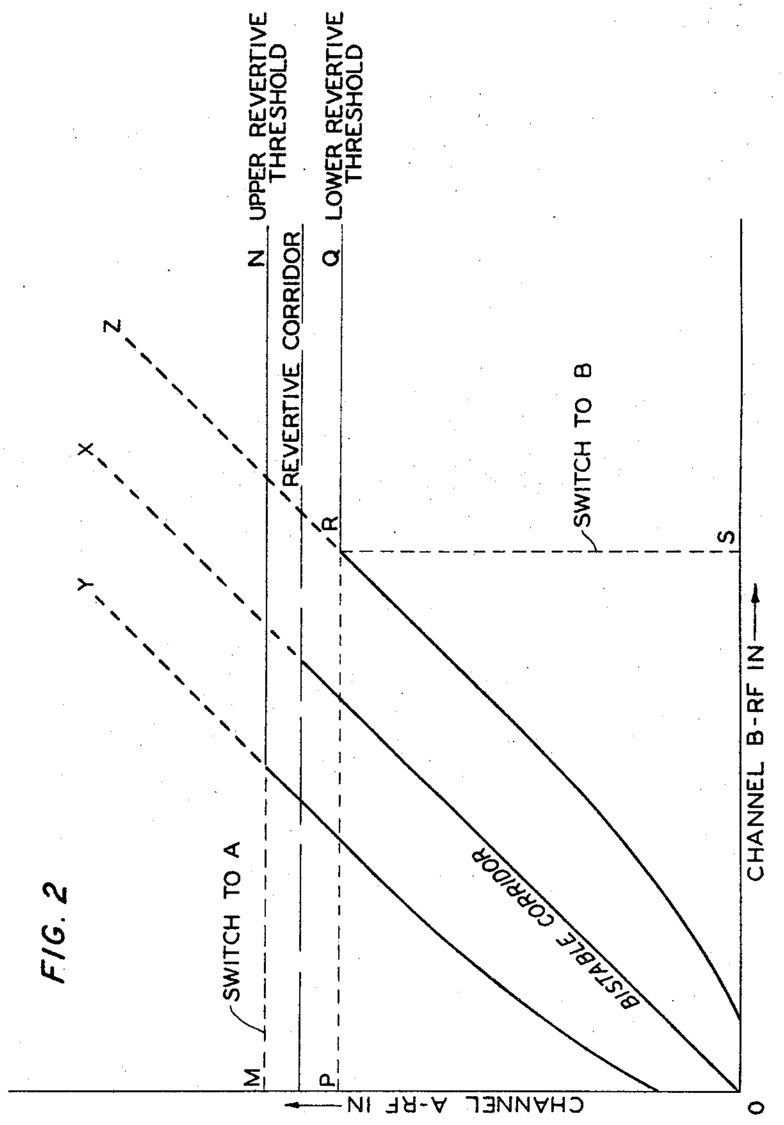

The above and other features of the invention will be considered with reference to the drawings, in which:

FIGS. 1 and 1A comprise a block schematic diagram of a diversity receiver according to the invention;

FIG. 1B is a showing of the convention for the detached contact schematic representation employed in FIGS. 1 and 1A; and, FIG. 2 is a graph illustrative of typical switching criteria employed in the diversity receiver of the invention.

The diversity receiver of the invention illustrated in FIGS. 1 and 1A is arranged for use in a system which affords radio transmission from a remote point over two different channels, designated as channels A and B, respectively, which are assumed to be distinguished on a frequency basis. Thus, the receiver is illustrated as arranged for use in a crossband diversity system. A typical example of such a system is that in which transmission over radio channel A is at a carrier frequency of approximately 6 kmc. and transmission over channel B is at a carrier frequency of approximately 11 kmc. By virtue of such difference in carrier frequency, it will be recognized that fading and other atmospheric interferences with transmission will differ for the two channels. Further, if, as is the usual practice, a common antenna or other common elements, such as an antenna feed network, are employed at the receiver station, it is most likely that transmission in the common portion is likely to differ for the two carrier frequencies. The invention provides means for recognizing these differences and preselecting one of the two channels to be preferred as the regular or working channel of the system to the greatest extent consistent with the operating conditions encountered. Thus, using the two carrier frequencies, identified with channels A and B above for purposes of example, one might expect transmission to be more reliable at 6 kmc. (channel A) than at 11 kmc. (channel B) under conditions of heavy precipitation in the transmission path. On the other hand, if a common antenna and antenna feed is employed, one might well find that greater attenuation would be encountered in the common elements by the 6 kmc. signal of channel A than by the 11 kmc. signal of channel B. It is assumed in the following that these and similar considerations have dictated the choice of channel A as the preferred channel.

In the receiver system of FIG. 1, separate radio receivers 10 and 12 with associated antenna 14 are arranged to produce demodulated or baseband outputs corresponding to message information transmitted over channels A and B, respectively. Each of radio receivers 10 and 12 is understood to include automatic gain control circuitry of a conventional type and to provide a control signal output from the automatic control circuitry which, in each instance, is representative of the level of the received radio frequency carrier. It is further assumed for purposes of illustration, although it is not necessary in the practice of the invention, that each of the radio channel facilities includes means for transmitting a pilot frequency signal along with communication signals which it has desired to receive. Such pilot signals are widely employed in radio systems and in similar systems in connection with order wire and other control functions.

It is emphasized that the use of automatic gain control and/or pilot signals as a source of diversity switching information constitutes only one method of obtaining the information as to channel performance required in the practice of the invention. Noise detectors might be employed at the signal output of each receiver or signal-to-noise ratio measurements might also be used to determine when a switch should be undertaken.

In the present instance, each of radio receivers 10 and 12 provides baseband output, a portion of which is applied to pilot monitors 18 and 20, respectively. Typically, such pilot monitors include a filter capable of isolating the pilot frequency and a simple detector circuit which provides a direct-current output signal, the amplitude of which is a measure of the level of the pilot frequency component so isolated.

The principal outputs of radio receivers 10 and 12 are applied over leads 22 and 24, respectively, to the transfer contacts of a relay K4, through which one or the other of the leads is connected to an output or utilization circuit 26. In a radio relay system, for example, the output circuit constitutes either the baseband or input amplifier for the radio transmitter in the next succeeding link of the radio relay system or terminal equipment. It will be understood that for purposes of illustration only, reference is made to a transfer relay K4, and, in fact, all switching functions will be described in terms of electromechanical relays. It is pointed out, however, that such functions may equally well be performed electronically using solid state switches comprising diode and/or transistor networks or equivalent electronic tube circuits.

According to the illustrated embodiment of the invention, the direct-current voltages available on automatic gain control output leads 28 and 30 of radio receivers 10 and 12 and the output signals available from pilot monitors 18 and 20 are employed to control relay switch K4 in accordance with criteria selected to optimize transmission between the remote source of radio signals and output circuit 26. To this end, the automatic gain control voltages from receivers 10 and 12 are applied to the inputs of a differential amplifier 32, the output of which reflects the differential comparison of the two input signals, that is, whenever the input signal from one of receivers 10 and 12 exceeds that from the other receiver by a predetermined amount, an output signal is produced. The output from differential amplifier 32 is applied to control the switching state of a Schmitt trigger circuit 34 in the usual fashion and this trigger circuit controls the operation of the relay K3. The switching points of the trigger are fixed by the gain of the differential amplifier and the bias circuitry of the trigger circuit itself. The arrangement thus far described provides a known type of diversity switch in which a control signal is derived, indicative of which of the two receiving channels is at any time providing the greater or better output signal.

In accordance with the invention, however, further means are provided to permit favoring that communication channel which, as explained above, may be expected on the average to provide the better performance. To this end, the control voltage on AGC lead 28 of receiver 10, which has been designated the preferred receiver, is applied to a second differential amplifier 36 wherein it is compared with a fixed level signal indicated in the drawing as provided by a bias battery 38. Whenever the control signal from receiver 10 exceeds the reference signal, an output signal is provided which is applied to control the state of Schmitt trigger circuit 40, which, in turn, controls the operation of a relay K6 in the manner outlined above in connection with differential amplifier 32 and relay K3.

The circuit arrangement described above provides control information which may be utilized to connect the preferred receiver to the output or utilization circuit 26 whenever the signal level at the preferred receiver exceeds a threshold set by reference source 38 and further provides information which may be utilized to select the second receiver on a bistable or differential basis under selected conditions. If the diversity receiver is to be used in a radio relay system, however, there may be circumstances which dictate the use of additional information which is made available by virtue of the transmission of pilot signals. Such conditions may occur, for example, when there has been a failure of equipment in some preceding link in the radio relay system such that the communication signal has been replaced by noise which might indicate satisfactory performance insofar as automatic gain control signals are concerned. Similarly, they could occur when a baseband (message signal) amplifier fails, with the result that although a normal automatic gain control signal is present, there is no baseband signal available for application to the utilization circuit. Accordingly, the direct-current signals available at the outputs of pilot monitors 18 and 20 associated with receivers 10 and 12 are applied to control additional Schmitt trigger circuits 42 and 44, respectively, the outputs of which determine the operation of relays of K1 and K2 in the manner already considered in connection with relays K3 and K6.

The various criteria which determine when a switch should be made between radio output receivers 10 and 12 as the source of signals applied to output circuit 26 may now be summarized. If one or the other of the pilot signals is absent, a switch to the other receiver of the other channel should be accomplished, regardless of the performance of the two receiving channels indicated by the automatic gain control voltages obtained therefrom. If, on the other hand, both pilot signals are present or if both pilot signals are absent for some reason, then the levels of received signals should control the selection of receivers and this is to be accomplished according to the following additional criteria.

If the preferred receiver 10 is providing an output, indicated by the automatic gain control signal, which is greater than the threshold or reference level set by battery 38, this receiver is to be preferred as a source of output signal regardless of the performance of receiver 12. If the performance of receiver 10 falls below this threshold, receiver 12 is to be substituted until receiver 10 again exceeds the threshold unless the performance of receiver 12 also deteriorates at the same time. Finally, if the performance of both receivers deteriorates so that the signal level of channel B approximates that in channel A and both are below the threshold for channel A, then the selection is to be made on a differential basis dictated solely by which of the two receivers at the time provides the greater signal at its output.

These criteria may be represented in the manner shown in FIG. 2 of the drawings. In the graph of FIG. 2, the signal level in channel A, the preferred channel, is plotted as the ordinate, while the signal level in channel B is plotted as the abcissa. The line OX thus represents the switching criteria applied for the usual differential diversity switch. That is, so long as the point plotted for a particular pair of signal levels in channels A and B, respectively, falls above line OX, a switch to channel A is indicated while if the point of intersection falls below line OX a switch to channel B is indicated. These are theoretical conditions of operation. In practice, lines OY and OZ illustrate or define a so-called bistable corridor which is substituted for line OX to provide a region in which no switch will occur in order to prevent constant and unnecessary switching between channels caused by minor variations in signal levels. This region defines the amount by which the signal in one channel must exceed that in the other in order to cause a switch. In a typical system, the total difference between signals to produce a switch might be set at 10 db or might be as great as 20 db. The curvature of lines OY and OZ in the example shown is caused by nonlinearity in the AGC circuits of the receivers and thus they depart from an idealized straight line, such as that represented by OX.

The modified switch criteria produced through the use of the invention add the upper an lower revertive thresholds defined by lines MN and PQ, which together define a region designated the "revertive corridor." Thus, so long as the signal in channel A remains above the upper revertive threshold, it is of no consequence that the signal in channel B resides to the left or right of the limit defined in dashed line RS. If the level in signal channel A (the preferred channel) decreases and passes through the revertive corridor to fall below the lower threshold, a switch to channel B is indicated if the signal in channel B is of a level falling to the right of line RS. In the case of the revertive corridor also, an area is defined to prevent unnecessary switching between channels and this area might be, for example, 5 db in extent. It will be recognized that if the signal in channel A falls below the lower revertive threshold and the signal in channel B falls to the left of dashed line RS, then differential switching will occur as in the usual diversity switch.

The various criteria illustrated in FIG. 2 are met by a logic circuit illustrated in FIG. 1A of the drawing which is in accordance with the detached schematic convention illustrated by the legend in FIG. 1B of the drawing. The various circuits controlled by the operation or release of the relays K1, K2, K3, and K6 of FIG. 1 are indicated. K4 is a relay which is selectively connected to a source of potential as, for example, battery 46 through the contact network of FIG. 1A, and controls the transfer contacts through which output leads 22 and 24 in FIG. 1 are selectively connected to output circuit 26.

The various conditions for which switching may or may not be required may be listed as follows:

(A) Both pilots present—channel A and channel B above threshold level.

(B) Both pilots present—channel A below threshold level; channel B above threshold level.

(C) Both pilots present—both channels A and B below threshold level; channel A greater than channel B.

(C1) Both pilots present—both channels A and B below threshold level; channel B greater than channel A.

(D) Channel A pilot absent—channel B pilot present; both channel A and channel B above threshold level.

(E) Channel A pilot present—channel B pilot absent—channel A and channel B both above threshold levels.

(F) Channel A and channel B pilots both absent—both channel A and channel B above threshold level.

(F1) Channel A and channel B pilots both absent—channel A below threshold level; channel B above threshold level.

(F2) Channel A and channel B pilots both absent—channel A above threshold level; channel B below threshold level.

Table I lists the several relays together with the indication which they represent and the significance of the operation of the particular relay.

TABLE I

| Relay | Indication | Significance |
|---|---|---|
| K1 | Channel A pilot | 0-pilot absent.<br>1-pilot present. |
| K2 | Channel B pilot | 0-pilot absent.<br>1-pilot present. |
| K3 | Channels A and B compared. | 0-channel A level greater.<br>1-channel B level greater. |
| K4 | Output transfer | 0-switch to channel A.<br>1-switch to channel B. |
| K6 | Channel A and threshold compared. | 0-channel A below threshold.<br>1-channel A above threshold. |

NOTE.—0-relay released, 1-relay operated.

Table II illustrates the condition of the relays that are operated or released for each of the possible operating conditions A through F2, outlined above. It will be recognized, with the aid of FIG. 1A of the drawings, that relay K4 is operated or released as required by the criteria outlined above and illustrated in the graph of FIG. 2 appropriately to connect output circuit 26 to one or the other of receivers 10 and 12.

TABLE II

| | K1 | K2 | K3 | K6 | K4 |
|---|---|---|---|---|---|
| A | 1 | 1 | 1 | 1 | 0 |
| B | 1 | 1 | 1 | 0 | 1 |
| C | 1 | 1 | 0 | 0 | 0 |
| C1 | 1 | 1 | 1 | 0 | 1 |
| D | 0 | 1 | 1 | 1 | 1 |
| E | 1 | 0 | 1 | 1 | 0 |
| F | 0 | 0 | 1 | 1 | 0 |
| F1 | 0 | 0 | 1 | 0 | 1 |
| F2 | 0 | 0 | 0 | 1 | 0 |

What is claimed is:

1. A diversity receiver system for communication signals including a message component and a pilot frequency component comprising first and second receivers for said communication signal, means for individually detecting the pilot frequency components and providing signals indicative of the presence or absence of such components, a utilization circuit, means for comparing the levels of the message component signal available from said first and second receivers and selectively connecting that receiver having the higher available message component to the utilization circuit, second comparing means for comparing the level of the message component from the first receiver with a predetermined threshold level and acting whenever the level of the message component from the first receiver exceeds the threshold level to connect the message component from said first receiver to the utilization circuit regardless of the receiver selectivity determined by the first comparing means and means over-riding the selections of both the first and second comparing means selectively connected to the utilization circuit whichever receiver provides the indication of the presence of the pilot component whenever the other receiver provides a signal indicating the absence of a pilot component.

2. A diversity receiver system comprising a utilization circuit, first and second sources of communication signals, said first source being preferred for normal application to said utilization circuit, means for connecting said first source to the utilization circuit whenever the level of available signals from the first source exceeds a predetermined threshold, differential means for comparing the levels of signals from said sources and effective when the signal from the first source remains below said threshold for connecting that source having the greater signal level to the utilization circuit.

3. In a crossband diversity system first and second receivers for message signals transmitted on carriers of different frequencies, one of said receivers being normally preferred as the source of received message signals, a utilization circuit, means for comparing chosen characteristics of the receiving signals determinative of transmission quality to determine which is superior for application to said utilization circuit, means controlled by said comparing means for applying the output of the receiver having the superior signals to said utilization circuit, a threshold comparator for comparing the signal quality of the message signals from said preferred receiver with a predetermined threshold quality and producing a control signal whenever the threshold quality is exceeded and means connecting the output of the preferred receiver to the utilization circuit to the exclusion of the output of the other receiver whenever said control signal is produced.

4. In a crossband diversity system first and second radio receivers equipped with automatic gain control circuits, a utilization circuit means for comparing the automatic gain control signals of said first and second receivers to obtain a comparative measure of received signal strength for said receivers, means responsive to said comparing means for applying the output of the receiver having the greater signal strength to said utilization circuit, a threshold comparator for comparing the automatic gain control signal from the first receiver with a predetermined reference level and switching means responsive to said threshold comparator for connecting the output of said first receiver to said utilization circuit whenever the reference level is exceeded and to the exclusion of the output of said second receiver.

5. A diversity receiver system comprising first and second sources of information signals, a common utilization circuit, a differential amplifier, means for applying quantities proportional to the levels of said first and second information levels to said amplifier to produce an output indicating which of said sources has a higher available signal level, means responsive to the output of said differential amplifier for connecting that source for the higher available signal level to the utilization circuit to the exclusion of the other source and means acting whenever the available signal from a predetermined one of said sources exceeds a predetermined threshold level to connect the signal from said predetermined source to the utilization circuit regardless of the source selection determined by said differential amplifier.

6. A diversity receiver system comprising first and second sources of information signals, a utilization circuit, means for comparing levels of the information signals available from said sources, a first trigger circuit controlled by said comparing means, said first trigger circuit in its respective states connecting the first or second source of information signals to said utilization circuit, means acting whenever the available signal from a predetermined one of said sources exceeds a predetermined threshold to produce a control output, a second trigger circuit, said second trigger circuit when operated in response to said control output connecting a signal from said predetermined source to the utilization circuit and negating the selection of source for connection to the utilization circuit effected by said first trigger circuit.

7. A diversity receiver system with a preferred information source comprising:

first and second sources of signals, a utilization circuit connected to said first source, a first differential comparing means for obtaining a first indication that the signal level from said first signal source is exceeded by a predetermined threshold, a second differential comparing means for obtaining a second indication that the signal level from said first signal source is exceeded by the signal level from said second signal source, means responsive to said first and second indications for transferring said connection of said utilization circuit from said first source to said second source upon occurrence of said first indication provided said second indication is also present, and for transferring said connection from said second source to said first source upon termination of said first indication despite continued presence of said second indication, and for transferring said connection from said second source to said first source upon termination of said second indication despite continued presence of said first indication, whereby said first source is connected to said utilization circuit whenever the signal level from said first source exceeds said predetermined threshold.

8. A diversity receiver system as claimed in claim 7 wherein said first indication activates a first circuit closure means and wherein said second indication activates a second circuit closure means and wherein said means for transferring from said first source to said second source includes switching means operated in response to power fed through said first and second circuit closure means in series so that said transfer to said second source occurs when both said circuit closure means are activated.

9. A diversity receiver comprising a predetermined channel, a diversity channel, a utilization circuit connected to said predetermined channel, and switching means for interrupting the connection between said utilization circuit and said predetermined channel and connecting said utilization circuit to said diversity channel only when the signal level on said predetermined channel is exceeded by both a predetermined threshold level and the signal level on said diversity channel.

10. A diversity receiver as claimed in claim 9 including a first comparing means for comparing the signal level on said predetermined channel with said predetermined threshold and a second comparing means for comparing the signal level on said predetermined channel with the signal level on said diversity channel, and wherein said switching means is responsive to both said first and said second comparing means.

References Cited

UNITED STATES PATENTS

| | | | |
|---|---|---|---|
| 2,282,526 | 5/1942 | Moore | 325—304 |
| 2,898,455 | 8/1959 | Hymas et al. | 325—304 |
| 3,328,698 | 6/1967 | Schreder | 325—303 XR |

KATHLEEN H. CLAFFY, *Primary Examiner.*

R. S. BELL, *Assistant Examiner.*